United States Patent [19]

Reuter et al.

[11] 4,265,074
[45] May 5, 1981

[54] WEB PROCESSING MECHANISM FOR FORMING PACKAGES

[75] Inventors: Daniel L. Reuter, Waldorf, Md.; Philip L. Reid, Duncan, S.C.; Charles M. Blackburn, Davidsonville, Md.; Clifton W. Heffner, Charlotte, N.C.

[73] Assignee: Sigma Systems, Inc., Capitol Heights, Md.

[21] Appl. No.: 955,752

[22] Filed: Oct. 30, 1978

[51] Int. Cl.³ .................. B65B 9/10; B65B 9/12; B65B 51/30
[52] U.S. Cl. .................. 53/551; 53/373; 53/389
[58] Field of Search .......... 53/551, 552, 550, 548, 53/373, 389; 156/583

[56] References Cited

U.S. PATENT DOCUMENTS

| 3,067,555 | 12/1962 | Newell et al. | 53/551 |
| 3,220,156 | 11/1965 | Hart et al. | 53/551 X |
| 3,488,914 | 1/1970 | Csernak | 53/551 X |
| 3,579,404 | 5/1971 | Spitznagel | 53/552 X |
| 3,685,250 | 8/1972 | Henry et al. | 53/551 |
| 4,040,237 | 8/1977 | O'Brien | 53/551 |

Primary Examiner—Horace M. Culver
Attorney, Agent, or Firm—Laurence R. Brown

[57] ABSTRACT

A packaging machine processes a continuous web fed from a roll to form a sequence of packages or bags preferably filled with a product during its formation and sealing. The bag is formed by folding the web and sealing two web edges together longitudinally and thereafter transversely processing the web to close and seal the package ends before cutting the package from the web. In processing the package, the transverse processing mechanism operates intermittently cyclically or upon demand to grasp the web, move it, seal it and selectively to cut it to produce optionally either individual packages or a web connected sequence of two or more packages.

The transverse processing mechanism comprises a piston operated reciprocable member with links moving two jaws on opposite sides of the web together into engagement with the web. The jaws have grasping, sealing and cutting members thereon, with the cutting member optionally programmed for cutting the web at will thereby permitting choice of individual or multiple package output products.

Firm contact operation with low operating power is achieved by moving in opposite directions two jaws by a reciprocating rocker movable over an arc of about 90° to extend two links to substantially linear disposition in opposite directions when the jaws close to grasp the web.

7 Claims, 7 Drawing Figures

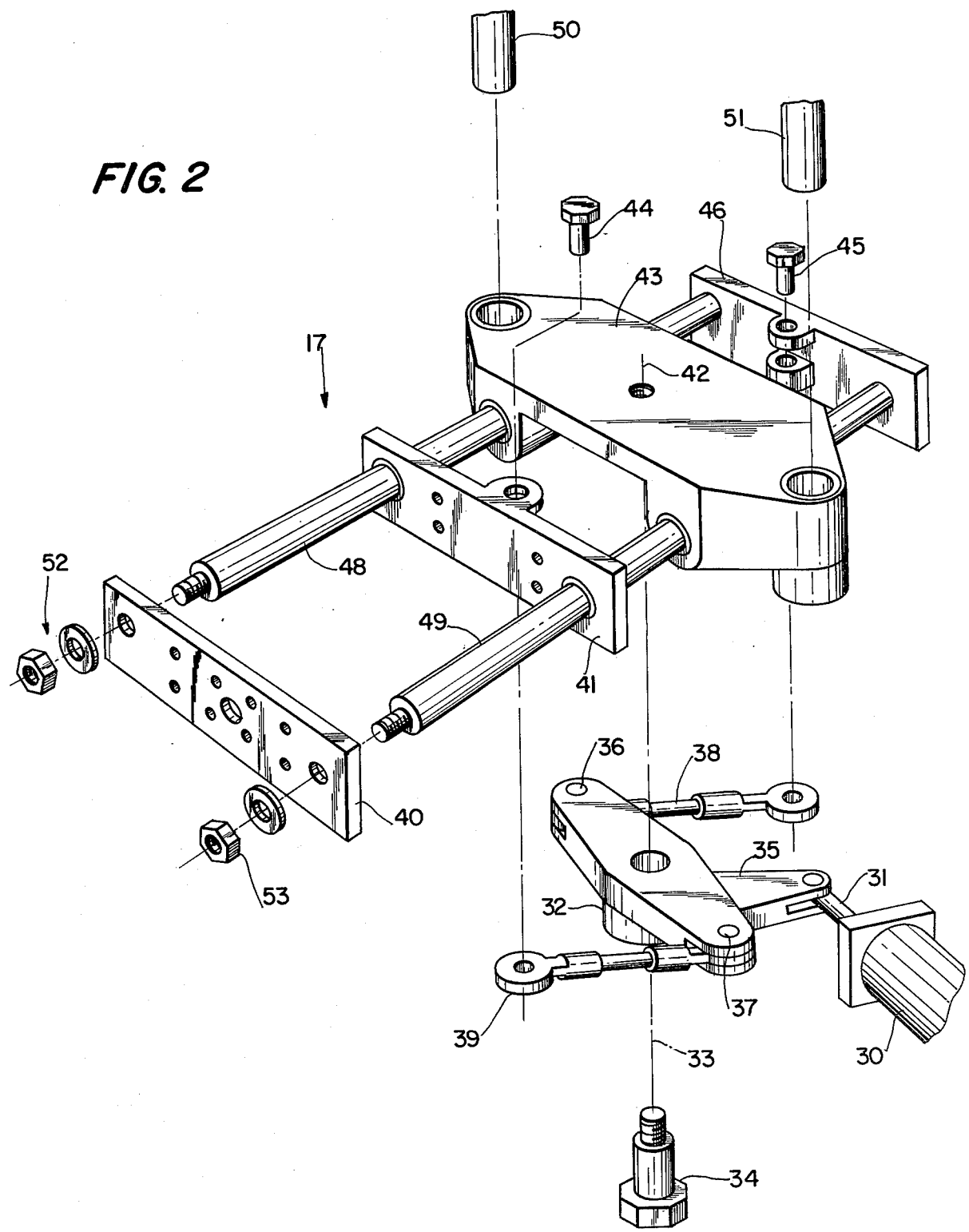

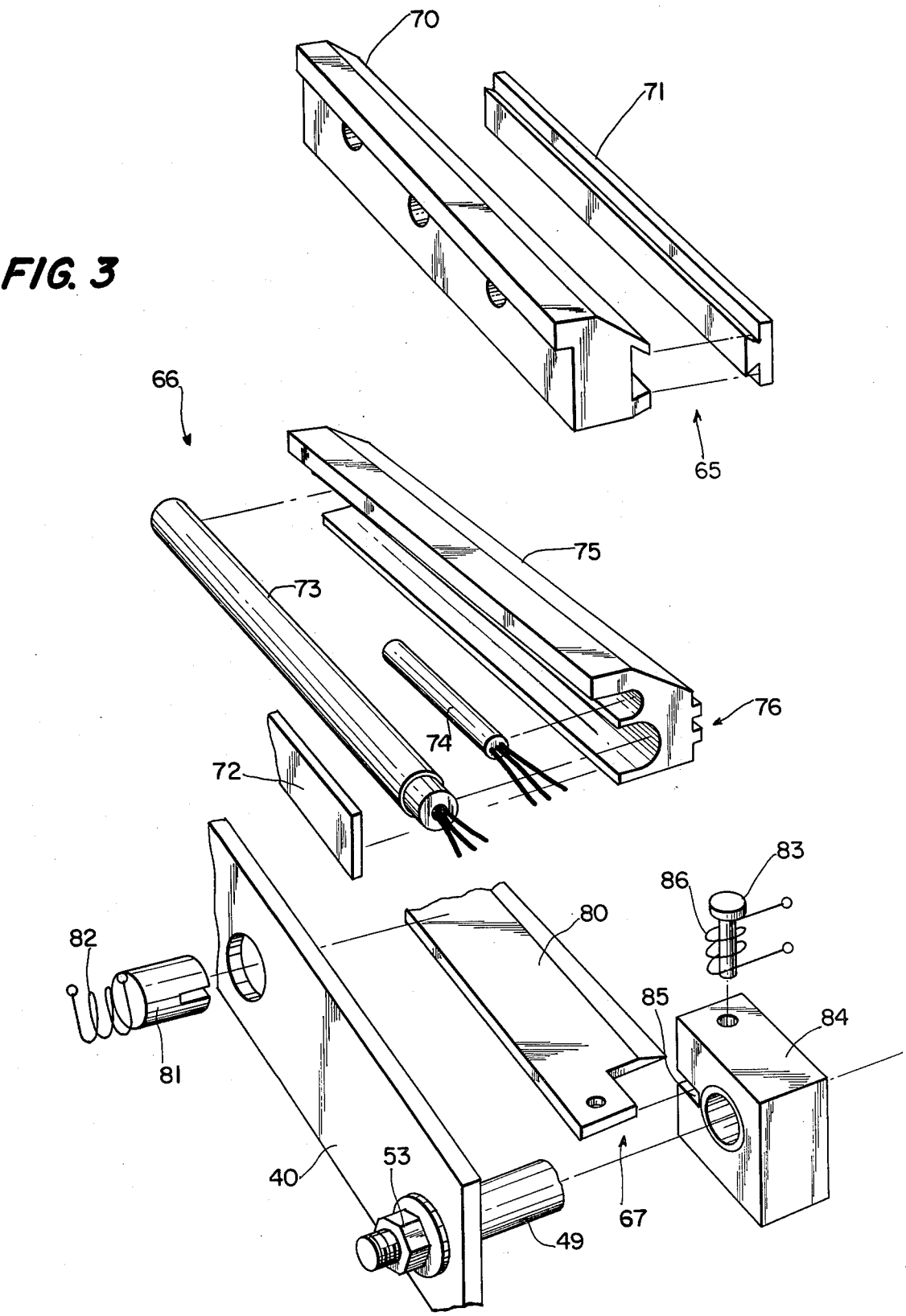

WEB PROCESSING MECHANISM FOR FORMING PACKAGES

TECHNICAL FIELD

This invention relates to machinery that form packages from a web of thermoset material and more particularly it relates to packaging machinery having a web processing mechanism for grasping, sealing and cutting said web for forming packages of various characteristics as the web is passed therethrough.

BACKGROUND ART

Packaging machines forming packages from a web are well known in the art. Representative examples of this art are the U.S. Pat. Nos. 3,544,340, Dec. 1, 1970, R. E. Miller et al., and 3,988,970, Nov. 2, 1976, Hanson et al. Such machines also are commercially available as for example the form-fill-seal packaging systems manufactured by Sigma Systems, Inc., 231 Westhampton Place, Capitol Heights, Md. 20027, which form from plastic web various packages for sealing in products such as hardware, candy, peanuts, etc., which may be counted out to assure each package has a known number of pieces.

At the heart of these machines is the mechanism for processing the packages by sealing the products in the packages during formation from the web and cutting the web to form individual or sets of packages. The operation and controls of such package forming and web processing mechanisms is critical to the automatic packaging machinery concept. Thus, the ideal mechanisms of this type need be foolproof, reliable over many cycles of operation, compatible in size and shape for mounting in a system, controllable to make packages of various size and characteristics, simple in construction, low in cost, and operable with little power. Also they should be adaptable for simplified controls in an automated system to vary package parameters.

Typical of web cutting machines are U.S. Pat. Nos. Re. 17079, Sept. 11, 1928. J. Hahn, 1,667,184, Apr. 24, 1928, M. H. Ballard and 4,054,075, Oct. 18, 1977, J. Doorak. However, these and other prior art machines do not provide the reliability, speed, flexibility and comprehensiveness of operation in an automated packaging system that need be adaptable for various packaging conditions, nor are they simple and low in cost.

BRIEF DISCLOSURE OF THE INVENTION

Therefore the present invention provides a simple inexpensive and adaptable automatic packaging system incorporating a simplified and efficient mechanism for processing a continuous web to form the packages, seal products thereinto, and to sever packages from the end of a continuous web from which they are formed.

Accordingly, a mechanism is afforded operable upon demand as programmed to automatic packaging system requirements, and providing significant operating force from a low power reciprocating member such as a hydraulic piston to open and close jaws in contact on opposite sides of a movable web. The mechanism incorporates a simple linkage coupled to a rocker member movable over an arc less than 360° to move jaw assemblies in opposite directions. This is accomplished by means of two links on opposite sides of the rocker member which move into substantially a straight line on opposite sides of the rocker member to reach an ultimate dead center position for contact with the web at high force. This feature permits great closing power from a modest prime mover power and uses few parts taking up little space.

Coupled to the jaws are heat sealing members if thermoset plastics are being processed, and programmable knife cutting means for severing the web between packages either individually or in sets of two or more. Thus, the single simple jaw operating mechanism serves the multiple function of grasping and moving the web, sealing it into a package and cutting the package from the web as progammed in a single unit or in sets.

Additionally are provided features such as safety means for preventing damage to the machinery or a foreign object if it gets in the path of the jaws. Thus, upon intervention of an object between the jaws in the jaw closing cycle such as a hand the jaws are opened. The mechanism is well adapted for making different size packages and for filling efficiently with various products in a fast automated packaging system.

BRIEF DESCRIPTION OF THE DRAWINGS

In the accompanying drawings:

FIG. 2 is a perspective exploded view of a package processing mechanism afforded by this invention to move a pair of jaws for engaging the web in the package forming process;

FIG. 3 is a perspective exploded view of a typical assembly of web processing devices assembled on the movable jaws of the mechanism of FIG. 2;

PREFERRED MODE FOR CARRYING OUT THE INVENTION

Figure 1:
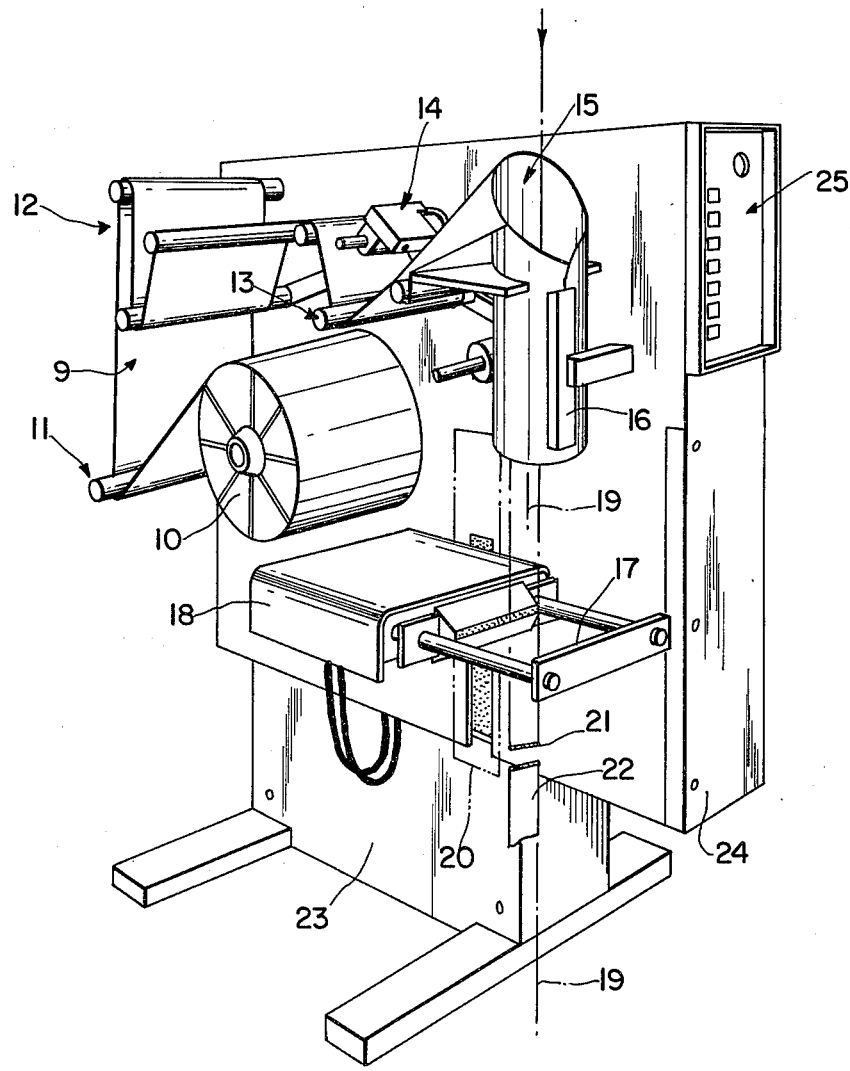
FIG. 1 is a diagrammatic view in perspective, of a package processing system afforded by this invention for processing a web to form and fill packages.

The packaging system as shown in FIG. 1 has a web 9 fed from roll 10 around a dancing or metering roller 10 and a roller array 12 to proceed past a printing station (not shown) for imparting a print to the web at a position controlled by registration bar 13 and photocell 14. The printed web is then fed over web forming and product feeding tube 15 through the longitudinal sealer 16 which seals together the web edges to form a web tubing 15 from a counter-feeder device (not shown) which is synchronized for operation with the packaging cycle.

Before the products are fed into the web tubing, the web is closed transversely at the bottom to retain the products by operation of the package processing mechanism 17 contained in and operable with a web advancing carriage mechanism 18, which pivots one end portion up and down along the web feed axis 19 oriented downwardly from feeder tube 16. This web advancing carriage mechanism 18 is vertically adjustable in slot 20 for varying in one mode the package length between the feeding tube 15 and the transverse seal 21 shown at the lower extremity of the swing arc taken by the pivoted end seal carriage mechanism 18 along the web path 19.

By pivoting the package processing mechanism 17 by carriage 18 to move upwardly along the web axis 19, it closes its jaws to grasp the web and close the lower package end for retaining products inserted inside tube 15. The mechanism additionally seals at 21 and cuts the former package from the web in a position 22 so that the products need not fall far past the end of feeding tube 15 and where the severed package 22 has not far to travel to reach a bin or conveyor (not shown) positioned to travel along the panel 23 or under the console portion 24 for carrying finished packages away from the packaging machine in either of two normal axes.

A control panel 25 is afforded for providing manual selection of such internal system operating parameters as to control bag length, and the cutting operation to sever packages individually or in multiple package strips, etc. Consider for example metering out a weighed amount of coffee into each package where a series of packages is desired on a strip to feed an automatic coffee vending machine. Also sometimes it is desired to offer a "two for . . . " sale and thus a strip of two joined packages may be desirable, or perhaps for filling a carton it is desirable to have a dozen packages in a strip with partial perforations for readily severing individual packages.

FIGS. 2 to 4 are directed to the mechanism 17 for transversely processing the web after it is formed into a tubing at seal 16. A package is formed and preferably filled by grasping the web, closing the end to receive products, sealing the web together, and cutting the ends of the package from the web to form the individual packages or package strips. It is, of course, to be recognized that this invention provides a versatile packaging system which can be used in many modes without departing from the spirit or scope of the invention. For example, the packages can be formed in a strip as a series of separable bags without filling with a product, and the web can be formed of other materials than the preferred thermoset plastics by incorporating sealing means other than the heated seal member illustrated herein.

This web processing mechanism 17 is operated in proper synchronism with the automated packaging system by actuating a reciprocable hydraulic piston assembly 30, for example, for providing motive power thereto whenever a package is to be formed and severed from the end of the continuous web fed through the system.

The sequencing and timing of a web through the various operations is conventional and is done for example in the hereinbefore mentioned form-fill-seal packaging system line.

When the piston assembly 30 is actuated, rod 31 extends and retracts to pivot rocker member 32 about its axis 33 on the pivot pin 34 back and forth over an arc less than 360° by means of link 35. The rocker member 32 has two opposed arms 36, 37 extending on opposite sides of the pivot axis 33 for driving respectively two connector links 38, 39 to operate two jaws 40, 41 in a mode more clearly seen from the diagrammatic view of FIG. 4.

Pivot pin 34 fits in aperture 42 in housing 43. The links 38 and 39 are connected by pins 44, 45 respectively to jaw 41 and yoke member 46 which moves jaw 40 by its connection with the rods 48, 49 to thereby draw jaws 40, 41 together and apart as the piston rod 31 moves back and forth. Rods 48, 49 are journalled to pass through frame 43 and jaws 41, thereby permitting jaw 41 to slide on the rod through the journalled bearings. Frame 43 can be held in place on the frame of a packaging system or a member thereof by bolts 50, 51. Nuts 52, 53 hold jaw 40 removably in place on the rods 48, 49, and jaw 41 can also be removed from the rods.

Figure 4A:
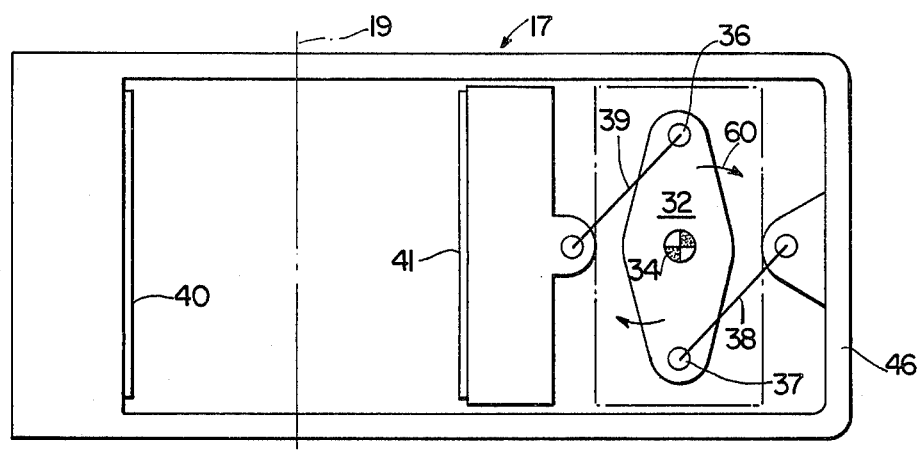
FIGS. 4A and 4B are schematic representations of the jaw movement mechanism showing its operational mode respectively in positions with the jaws open and closed to grasp the web.
Figure 4B:
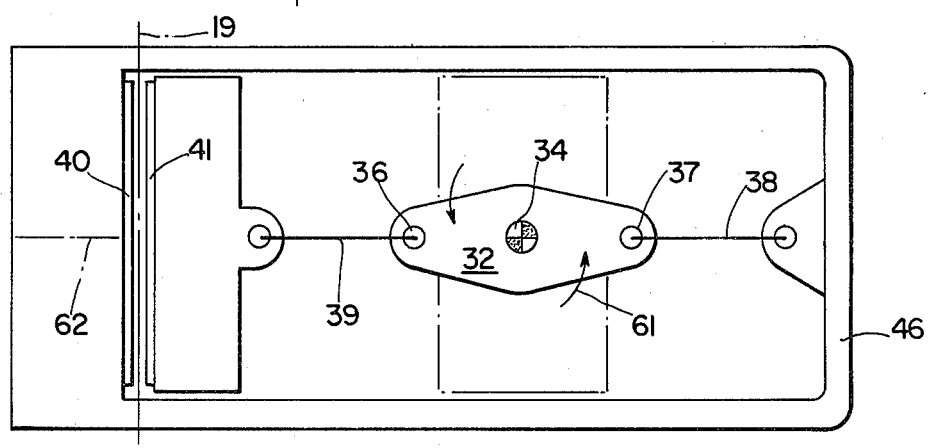

With reference now to FIGS. 4A and 4B it is seen that the rocker member arms 36, 37 are pivoted in an arc about pivot pin 34 to assume a position at the two extremities of movement, depicted in FIG. 4A and FIG. 4B respectively, as the drive piston rod 31 and rocker member 32 reciprocates. The axis 19 of the web travel path is shown in position between the jaws 40, 41 with the jaws opened in the position of FIG. 4A and closed to grasp the web in the position of FIG. 4B. Thus, clockwise arrows 60 shown in FIG. 4A indicate the rocker member 32 has been rotated clockwise to permit links 38, 39 to open the jaws 40, 41. Conversely in FIG. 4B the counterclockwise arrows 61 indicate movement that closes jaws 40, 41 on the web axis 19. In this preferred embodiment the arc of reciprocation approximates 90°. It is to be noted that this mechanism operable in this way uses a very low power hydraulic piston assembly 30 to exert high closing forces of the jaws 40, 41 to grasp, seal and cut the web as the occasion calls for during the program of the automatic packaging system. This results from the manner in which the mechanism at closure of the jaws 40, 41 nearly lines the links 38, 39 in a straight line along linear axis 62 to provide near closing position a great leverage advantage, as operated in this mode with the mechanism pushing the respective jaw assemblies in opposite directions to close the jaws. This structure and mode of operation results in a very simple mechanism operable at low power over many cycles with high reliability and excellent grasping force on the web for closing, sealing, cutting or moving the web.

As may be seen from FIG. 3, a series of devices may be attached to the jaws 40, 41 for engaging the web and processing it in the package forming and filling operation. Typically a cold grasping assembly 68, a heat sealing assembly 66, and a programmable knife cutting assembly 67 are spaced along the length of the web and transversely extend across the web width. Other devices such as a perforating cutter that forms a tear line between two packages without severing the strip can also be used, as desired.

In operation, the cold jaw inserts 70, 71 attachable to jaw 40 provide respectively a holder and a clamp with an elastic face that engages the opposite jaw assembly 41 to grasp the web. These parts interfit by the tongue and groove assembly shown so that a new rubber facing can be easily installed without disassembly. Thus, this cold clamp closes the web tubing at the bottom of a package to be formed so that it can be filled with products, while the devices 66 and 67 respectively seal and cut the web. Other combinations and devices could, of course, be used on the jaws.

The heated jaw element 66 stacks an insulator plate 72 and a heated metallic unit 75 into which is inserted in the receptacle grooves a heater element 73 controlled by a thermostat system operated by the heat detecting thermistor insert 74 located inside the receptacle jaw facing unit 75. Thus, the unit 75 is heated to the proper temperature to press bead (or beads) 76 against the tubular web and seal the two layers together transversely at a location between successive packages.

The cutter assembly 67 has the knife blade 80 movable selectively into cutting position against an anvil (not shown) on the opposite jaw 41 by means of movable drive pin 81 which as programmed by the automated system moves longitudinally to engage knife 80 and push it forward to cut the web at a position located between two adjacent packages. If controlled by a solenoid or hydraulic cylinder the drive pin can be intermittently controlled at the times desired. However, if cyclically driven during each package forming cycle by a cam or the like, it is provided with an intermediate compressible spring assembly 82 so that it can proceed over the cycle even if the knife blade is stopped short of the cutting position by inserting pin 83 in the block 84. The blade 80 is stopped short of the cutting anvil because pin 86 hits the blade on entry to slot 85 and thus holds it away from cutting position to skip a cutting cycle whenever programmed by the accompanying system to operate solenoid coil 86 or some equivalent mechanism as a cam operated interposer. The solenoid coil 86 thus is used to selectively control the cutting cycle in the process of providing strips of two or more adjacent packages.

If FIG. 1 is viewed, it is seen then that the jaw assembly mechanism 17 is pivoted upwardly where the jaws can be closed to grip the web by means of cold jaws 65 thereby closing the web tubing and permitting entry of a product in tube 15 for forming a package around the product. As the jaws pivot downwardly by operation of the mechanism 18, and pull a corresponding length of web from the roll 10, there is time to heat seal at 21 and cut the web to form separate package unit 22 by cutting at the top of the preceding bag. A similar heat seal unit to 76 may be located on the jaw 40 beneath the knife 80 if desired to seal the top of the preceding bag, which is released when the jaws open to drop vertically into a bin or on a conveyor belt.

Figure 5:
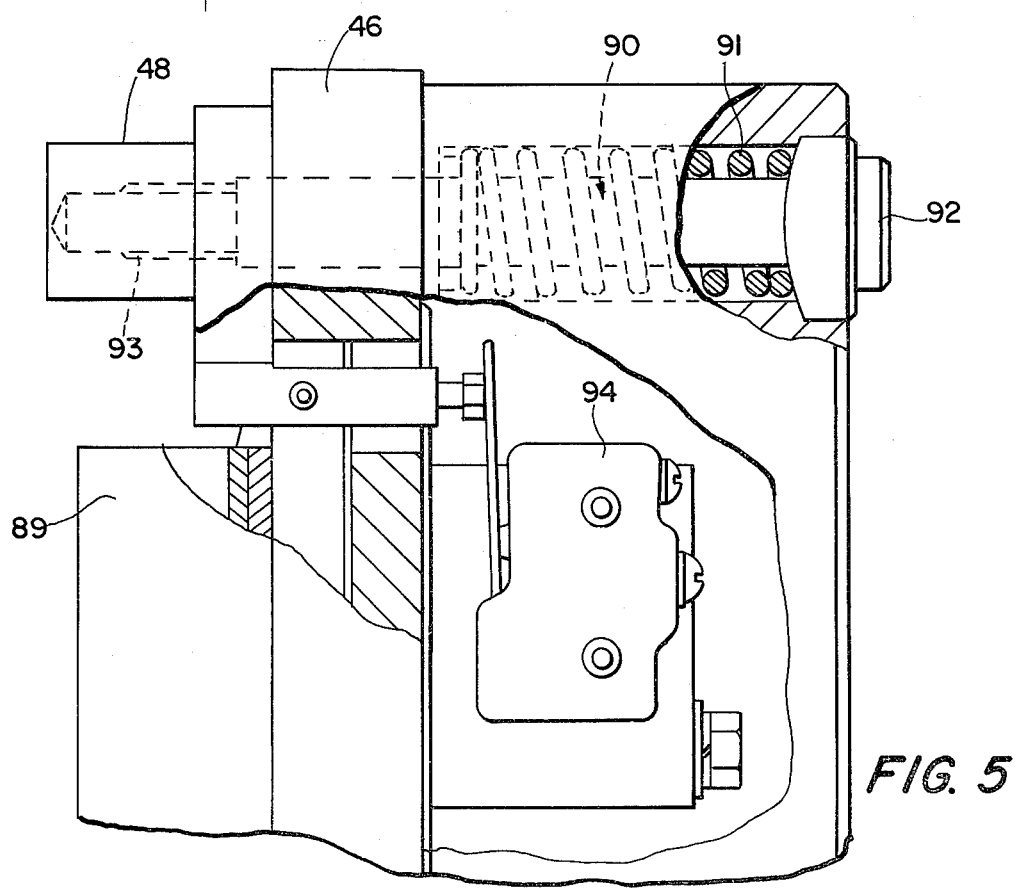
FIG. 5 is a segmented view, partly in section, to show a safety feature attached to the movable jaw mechanism to prevent jaw closure in the presence of a foreign object in the travel path.

As may be seen from FIG. 5, the yoke member 46 at the link end of rob 48 (FIG. 2) may be fitted with a stripper spring assembly 90 which arranges spring 91 about the bolt 92 connected to threads 93 in rod 48, so that it compresses whenever member 89 hits an obstacle such as at the end of the jaw closing cycle. Thus, at the end of the jaw closing cycle when the link driving reciprocating member 32 is reversed, the spring 91 serves to provide a spring biased stripping action at the start of the reverse reciprocation to help the jaws open.

The microswitch assembly 94 is actuated whenever the spring 91 is compressed before the end of the jaw closing cycle and serves through appropriate control circuits to reverse the jaw control cylinder 30 and open the jaws. Thus, the spring 91 is designed to yield and operate switch 94, for example, if a person got his hand in between the jaws during a closing cycle as soon as member 89 is encountered to compress spring 91 and thus actuate switch 94. The switch also operates if undue friction is encountered or other objects impede the closing of the jaws and thus serves as a safety feature, and can be locked out when the jaws are nearly closed if the cylinder is reversed by other control means during the automatic cycle.

Figure 6:
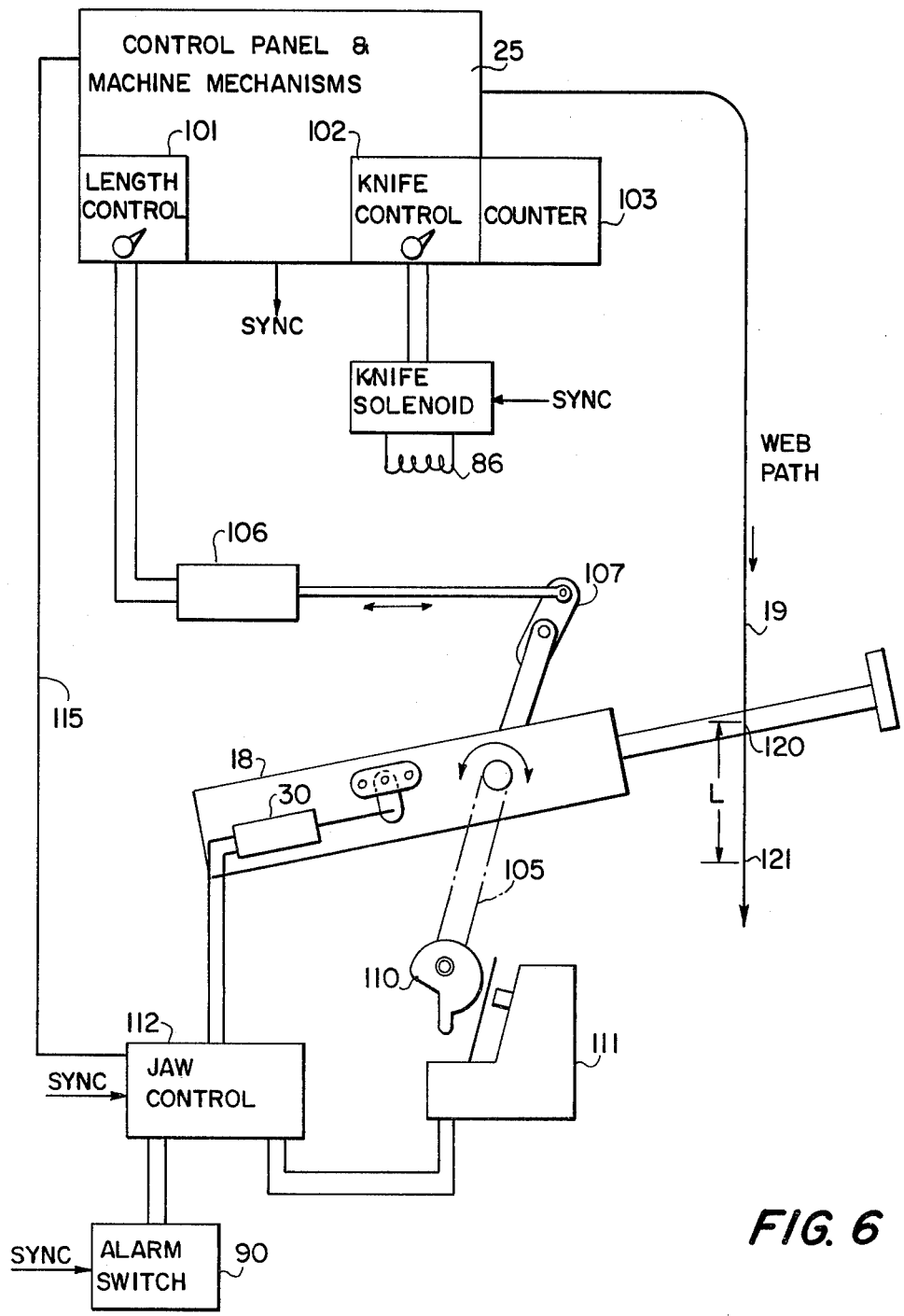
FIG. 6 is a block diagram schematic control system showing the operational features of the package processing mechanism of FIGS. 2 to 5 as it relates to and operates in an automatic packaging system such as shown in FIG. 1.

Typical control circuits that may be used in operation of the system are illustrated schematically in block diagram form in FIG. 6. Thus, the control panel 35 has at least package length control unit 101 and knife control unit 102 which can be selectively operated respectively to control package length and the number of packages in a strip before cutting.

To produce two or more sequential packages between cuts of the web, counter 103 coupled to count package forming cycles is connected to operate the knife solenoid unit 104 to actuate solenoid coil 86 as previously described on a specified count of 1 or more thereby to form individual packages or strips of two or more successive packages.

The package length control might be effected over a limited range of lengths, for example, by the pivoting of the end seal carriage 18 around shaft 105 by means of actuator 106 and pivot arm 107 over a desired arc for moving upwardly the desired package length along the web path 19, then gripping the web at the uppermost travel position along path 19 and pulling downwardly a desired length to the lowermost travel position before releasing the web. The jaws may be controlled typically over the pivot cycle by the cam 110 and switch 111 through the jaw control circuit 112 to operate cylinder 30 in the manner hereinbefore described to close and open the jaws on the web along path 19 as the web is withdrawn. The before described alarm switch 90 can reverse cylinder 30 at any time during the jaw closing cycle to override cam switch 111. Routine synchronication will all automatic packaging operations in the system over a packaging cycle is done in a routine manner as indicated by the sync leads, and other interconnected timing or control actions are typified by lead 115.

It would not depart from this invention to use the jaw control mechanism in any suitable system for automatically producing bags as represented by control panel and machine mechanisms 25 which represents for example packaging systems of the type hereinbefore described and including machine controls and sequencing mechanisms. It is only necessary that the jaw controls 112 are programmed to close the jaws at point 120 to pull the web to position 121 where the jaws are opened thereby advancing the web through path 19 enough for forming one package of length 1. To the extent that any specific operation of the sequence in such controls are required to produce a preferred embodiment of this invention, the subject matter of copending U.S. applications Ser. No. 955,574 and Ser. No. 955,720 filed the same day herewith describing respectively (a) the timing and control systems and (b) the operation of the mechanism for advancing the web are incorporated herein in entirety.

INDUSTRIAL APPLICABILITY

The invention provides both a packaging system and mechanisms operable in an automatic packaging system for converting a continuous web into a sequence of packages preferably filled with products and cut from the web into individual package assemblies.

The mechanisms is preferably used with thermo-set plastic web materials to heat seal the web in formation of both longitudinal and transverse seals to form packages into which products such as peanuts or hardware are inserted and sealed.

The particular mechanisms afforded are simple, safe, sanitary, reliable, inexpensive and adaptable to various packaging conditions for food and other product lines, and is adaptable for use with product batch counters to control the exact number of items packaged.

We claim:

1. A package forming machine system for feeding a continuous web provided from a supply roll through a tubular member folding over and sealing the web edges longitudinally, and thereafter for transversely processing and sealing the web to form a sequence of packages by a processor mechanism transversely engaging the web as the web is fed past the forming member in tubular form, said processor mechanism comprising in combination, intermittently operated web transport means for pulling the web through the system constituting a reciprocable carriage mechanism pivotable about an axis and having mounted thereon remote from the pivot axis a pair of movable jaws for reciprocating as the carriage mechanism is pivoted and operable for gripping during only one direction of reciprocation said longitudinally sealed web and pulling off a length of web from said supply roll, motive means for relatively moving said jaws into and out of engagement with said web on opposite sides thereof in a plane substantially perpendicular to the web comprising a reciprocable member providing motive power for moving said jaws in and out of said engagement during said one direction of engagement, a pivot axis perpendicular to the plane of movement of the jaws carried by said carriage mechanism, a rocker member with opposed arms extending from said pivot axis and pivotable about said axis connected for rotation through a reciprocating cycle arc of less than 360° by said reciprocable member, and a link connecting either rocker arm respectively to one of said jaws for moving them simultaneously toward and away from engagement with the web in response to reciprocation of said reciprocable member, wherein the linkage lengths and jaw movement are related so that the rocker arm extends the links to a position substantially along a straight line as the jaws engage said web, thereby to provide high pressure on the jaws with relatively small power produced by said motive means.

2. The system as defined in claim 1 including means for advancing the web a predetermined length and control means coupled to operate said reciprocal member for grasping said web once during each web advance.

3. The system as defined in claim 1 wherein the web is of a thermo-set characteristic including a heated member for engaging the web as the jaws move into engagement thereby to form a transverse seal between two web layers.

4. The system defined in claim 1 wherein the jaws have mounted therein three members longitudinally spaced along the web travel path comprising a heated sealing member, a knife and a cold web gripping member.

5. The system as defined in claim 1 wherein a knife is mounted on said jaws to cut the web as the jaws move into engagement.

6. The system defined in claim 5 including means mounted in the jaws to seal the web together transversely as the jaws close wherein the knife is held for movement with said jaw only when engaged by a selectively operable knife engagement member, and means for operating said engagement member cyclically in response to longitudinal movement of said web thereby to permit at least two sequential packages to be sealed by the sealing means in adjacent positions along the web before the knife is engaged to cut the web.

7. A package forming machine system for feeding a continuous web provided from a supply roll through a tubular member folding over and sealing the web edges longitudinally, and thereafter for transversely processing and sealing the web to form a sequence of packages by a processor mechanism transversely engaging the web as the web is fed past the forming member in tubular form, said processor mechanism comprising in combination, intermittently operated web transport means for pulling the web through the system constituting a reciprocable carriage mechanism having mounted thereon a pair of movable jaws for gripping during only one direction of reciprocation said longitudinally sealed web and pulling off a length of web from said supply roll, motive means for relatively moving said jaws into and out of engagement with said web on opposite sides thereof comprising a reciprocable member providing motive power for moving said jaws in and out of said engagement during said one direction of engagement, a pivot axis within said carriage mechanism, a rocker member with opposed arms extending from said pivot axis and pivotable about said axis connected for rotation through a reciprocating cycle arc of less than 360° by said reciprocable member, and a link connecting either rocker arm respectively to one of said jaws for moving them simultaneously toward and away from engagement with the web in response to reciprocation of said reciprocable member, wherein a stripper spring member is coupled for compression when the jaws are moved into engagement, and switching means for reversing the operation of said reciprocable member is coupled for operation when the stripper spring is compressed during movement of the jaws over its stroke before engagement of the jaws thereby to prevent movement of the jaws into engagement when a foreign object comes between the jaws.

* * * * *